Dec. 4, 1951 N. E. SMITH 2,577,373
GARDEN TRELLIS
Filed Jan. 8, 1945
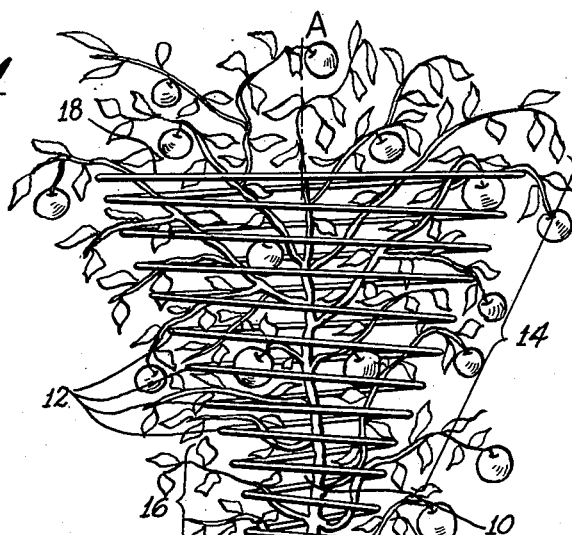
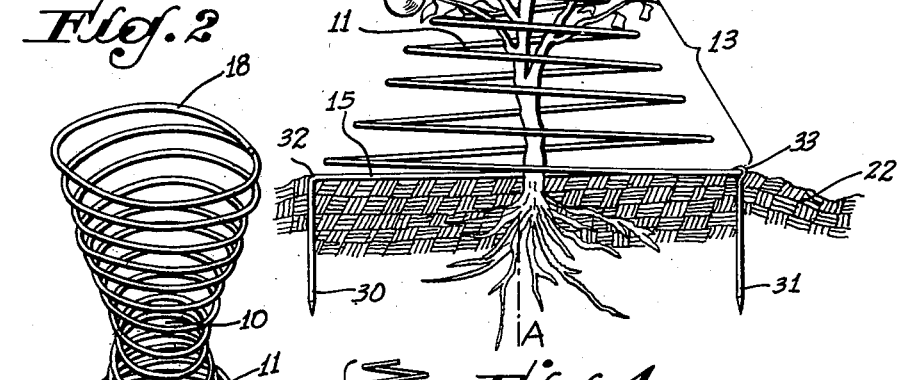
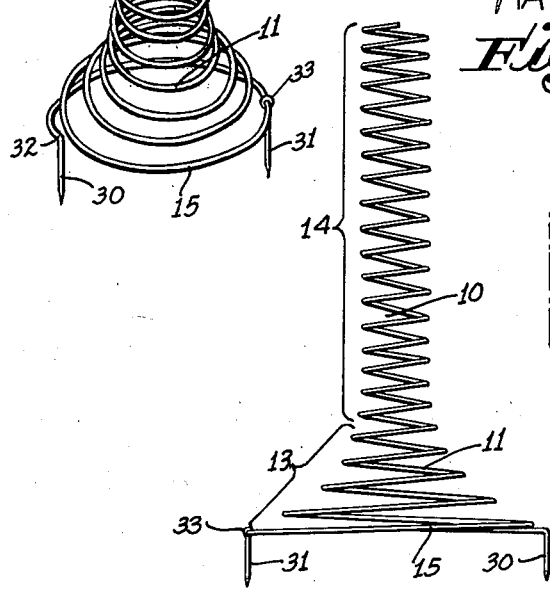
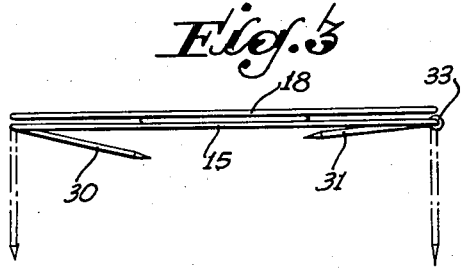
INVENTOR
NORVIN E. SMITH
BY
HARRIS, KIECH, FOSTER & HARRIS
FOR THE FIRM
ATTORNEYS

Patented Dec. 4, 1951

2,577,373

UNITED STATES PATENT OFFICE 2,577,373

GARDEN TRELLIS

Norvin E. Smith, Altadena, Calif.

Application January 8, 1945, Serial No. 571,848

2 Claims. (Cl. 47—47)

My invention relates to a garden trellis for use in supporting plants of various types and, more particularly, to a novel embodiment of this nature which is compressible and which can be extended or compressed readily without the use of special tools or equipment to meet requirements of plant growth or of seasonal storage and use.

In the home garden, as well as in commercial ventures, it is a desirable practice to provide support for many types of garden plants, such as tomato plants, peas, climbing varieties of beans, berry vines, ornamental plants, flowers, young trees, shrubs, etc. Many garden plants grown for their edible products tend to spread over a large area unless their growth is controlled and confined to a certain predetermined direction, preferably vertical. Controlled vertical growth not only results in the use of a minimum of ground space per plant, but makes for easier cultivation and irrigation and facilitates access to the plant for such necessary operations as pruning, spraying, picking, etc. My invention is well suited to the support of garden plants of the branching or vine type bearing edible products which desirably should not contact the ground, e. g., tomato plants, where support results in a superior grade of fruit free of the bruises and rot normally caused by contact with the ground. Also, many tall plants having stems that are slender in proportion to the load carried, such as sunflowers, young fruit trees that are beginning to bear, etc., are in need of support during various stages of their growth, especially when their location is such that they are subjected to the forces caused by wind and rain.

The common practice presently employed is to drive one or more rigid stakes, usually of wood, into the ground adjacent the plant to be supported. A single stake is most often used, such stake being driven into the ground close to the stem of the young plant, thereby tending to damage the root system of the plant. It is periodically necessary to tie the branches of the growing plant to the stake or stakes, constant attention being required to secure an orderly control of growth. Another objection to this type of support is its rigidity. Under the stress of wind and rain, such rigidity, in combination with an inadequate supporting base, will often tend to result in a loosening and eventual tipping or leveling of the stake, with the resultant loss of or extensive damage to the plant involved. Even if the stake is not loosened as discussed above, the great difference between the rigidity of the stake and the plant will result in widely differing degrees of deflection of each under the stress of wind or rain, with consequent damage to the plant. The rigidity of the plant can be made to approach that of the stake by tying at minute intervals, but obviously this is impractical.

An object of my invention is to provide a practical, inexpensive means for controlling the direction of growth of, and for supporting various species of, garden plants. My invention consists of an adequately anchored base surmounted by a spiral trellis for supporting plants without the necessity of tying the plant to the support.

Another important object of my invention is to provide a trellis having a degree of flexibility more nearly approaching that of the plant it supports, yet having sufficient rigidity to provide adequate support even when subjected to the stress of such natural elements as wind, rain, etc., and having sufficient resilience to return to its initial position when subjected to a normal deflection. This feature of flexibility and resilience permits the trellis and supported plant to sway in unison, neither deforming unduly at any one position, thereby affording maximum protection to the plant by reducing the tendency of the plant to whip in the wind. A large portion of the energy developed by any forces applied to the trellis is dissipated by the local flexing of the trellis during the swaying action, thereby materially reducing the energy applied to the base and the possibilities of loosening or tipping same.

Another very important object of my invention is to provide a trellis formed of a sufficiently flexible material so that the trellis may be compressed or extended readily without the use of special tools or equipment. This feature permits the trellis to be compressed into a compact, conveniently handled form requiring a minimum of storage space when not in use.

Still another object is to provide a plant support having a base encircling the plant at ground level to guide in furrowing or cultivating, thus preventing damage to the roots during such operations.

Other objects and advantages will be apparent from the following description of exemplary embodiments of the invention.

Referring to the accompanying drawing:

Fig. 1 represent an elevation view of one embodiment of my invention;

Fig. 2 represents a perspective view thereof;

Fig. 3 represents an elevation view thereof when compressed; and

Fig. 4 is an elevation view of another embodiment of my invention.

Referring particularly to Figs. 1 and 2, the garden trellis, indicated generally by the numeral 10, is shown resting upon the ground 20 and, as will be hereinafter described in detail, is attached thereto by an anchoring means 30 and 31.

As illustrated, the trellis 10 includes a single elongated member 11 of circular cross section forming a plurality of superimposed, substantially circular spiral turns or convolutions 12 that encircle and support the plant. The convolutions 12 are disposed to form an upwardly-converging base section 13 and an upwardly-diverging upper section 14, the resulting trellis 10 having the general configuration of an asymmetrical hourglass.

The base section 13 provides a ground-engaging foundation member, preferably formed by the lowermost convolution, indicated by the numeral 15. The lowermost convolution 15 encircles the stem of the plant and rests on the ground 20. The diameter of the foundation member is preferably sufficiently large, even in the absence of the anchoring means 30 and 31, to insure adequate stability for the entire trellis and supported plant when any forces due to wind, rain, etc., are applied. The diameter of the foundation member 15 is also sufficiently large to afford protection to the root system 21 of the plant by preventing close cultivation and serves as a guide for locating an irrigation furrow 22.

It is an important feature of the base section 13 of my invention that its convolutions should converge upwardly, as shown, by being of progressively decreasing diameter. A narrow throat section 16 is formed at the junction of the base section 13 and the upper section 14 and guides the main stem of the growing plant along the vertical axis of the trellis, indicated by the line A—A of Fig. 1, thereby keeping the center of gravity of the entire plant on or near this vertical axis and providing maximum stability for the combined mass of the trellis 10 and the supported plant.

As illustrated in Figs. 1 and 2, the convolutions of the upper section 14 diverge upwardly from the junction of the base and upper sections. The diverging effect is preferably produced by forming each successive convolution with a progressively increasing diameter. This particular embodiment of my invention is well suited to the support of plants having a tendency to branch profusely a short distance from the ground. The branches are free to extend laterally between and engage the several convolutions, thereby supporting the plant.

My invention provides a trellis characterized by its inherent flexibility and resilience. When the trellis is deflected from an initial upright position by the stress of wind or the like, the deflection is distributed along the entire length of the elongated member 11 and is small at any one point on the member 11. With the forces normally encountered, a flexible trellis will result despite the use of an extremely rigid material and, more important, since the stress at any one point is small, a flexible material having a low yield point may be used without permanent deformation of the elongated member 11, thereby providing a resilient trellis. From these premises, it can be seen that a large number of materials may be employed satisfactorily. The selection of a material is dictated to some extent by the conditions under which the trellis is used. A heavy plant in a windswept location will require a stiffer, more resilient material than a light plant in a sheltered location. It has been my experience that a trellis made of common iron wire of approximately one-quarter inch diameter will meet the requirements of most garden plants under normal conditions. This material has the advantages of being plentiful and relatively inexpensive.

Ordinarily, means for anchoring the trellis to the ground are not required since the weight of the trellis and supported plant and any incidental accumulation of earth on the foundation member 15, due to cultivating and furrowing operations, combine to prevent tipping of the trellis. However, if the trellis is used in a very windy location where deflections are encountered that may be sufficient to shift the center of gravity laterally outside of an imaginary vertical cylindrical surface bounded by the foundation member 15, then additional anchoring of the trellis is essential. The most convenient means for anchoring the trellis includes anchoring members or pins inserted in the ground as indicated by the numerals 30 and 31. The anchoring pin 30 is formed by bending the end of the foundation member 15 downwardly at 32 substantially parallel to the vertical axis A—A of the trellis. A supplementary anchoring pin 31 is pivotally attached to the foundation member 15 by looping one end of the anchoring pin around the foundation member 15, as indicated at 33. Additional supplementary anchoring pins of the type shown at 31 may be used, if desired, by spacing them uniformly around the foundation member 15. The lower end of each anchoring pin is usually sharpened to facilitate insertion into the ground. The use of anchoring pins attached to the periphery of the foundation member, as described, precludes the damage to the root system that would result through the use of a central stake.

When the trellis is being stored, shipped, etc., it can be reduced to the compact configuration of Fig. 3 by compressing the trellis downwardly and retracting the anchoring pins upwardly substantially into a zone within the lowermost convolution 15. This operation may be performed by hand without the use of special tools or equipment and the convolutions of the trellis need not be tied together unless the trellis is formed of a highly resilient material, such as spring wire. When the preferred material, common iron wire, is used, permanent deformation occurs and no tying is required. In addition, the trellis, as an article of manufacture, may be fabricated to assume the shape indicated by Fig. 3 when the preferred material is used.

The preferred practice is to install the trellis while the plant requiring support is small. The anchoring pins, if used, are extended downwardly and inserted in the ground so that the convolutions of the trellis encircle the plant. The trellis is then extended to any desired height by placing the feet on the foundation member 15 and pulling upwardly on the uppermost convolution 18. The height of the trellis may be adjusted during the growth of the plant by varying the spacing of all or part of the convolutions to compensate for errors in determining the initial height.

Another embodiment of my invention is illustrated in Fig. 4, differing only from the embodiment heretofore described in that the convolutions of the upper section 14 are of substantially constant diameter. This embodiment is well suited to the support of tall plants with a slender stem, or for such vine-like climbing plants as beans or peas. The tendrils of the latter will engage the convolutions of the trellis and the growing vine will follow the convolutions with little attention and no necessity for tying.

The general configuration of the trellis can be altered by means of upper sections of various shapes as determined by the requirements of the plant being supported. Configurations can be devised to impart distinctive shapes to ornamental shrubs and climbing vines to produce an esthetic effect. These and other modifications can be incorporated without departing from the spirit of my invention, as defined in the appended claims.

I claim as my invention:

1. An adjustable-height collapsible garden trellis for supporting plants which increase substantially in height and in weight of foliage and fruit as they mature, said garden trellis including a single length of common iron wire shaped as a double conical unit with a lowermost turn disposed in a plane to form a foundation member, with progressively decreasing-diameter spaced turns spiraling inwardly and upwardly from said foundation member to a smallest turn and with progressively increasing-diameter spaced turns spiraling outwardly and upwardly from said smallest turn to end in an uppermost turn of approximately the same diameter as said lowermost turn, all of said turns except said lowermost being supported exclusively by the turns thereebeneath and each of said turns between the lowermost and uppermost being subjected to torsional forces due to the weight of the turns thereabove, said double conical unit being disposable around a growing plant with said foundation member resting on the ground in an annular zone around the plant so that the plant can grow upwardly within said double conical unit and spread outwardly between said spaced turns, the weight of the foliage and fruit not otherwise supported by said plant being borne exclusively by said turns and being transferred through said turns to said foundation member, said iron wire having a relatively low yield point to permit periodic increase in height of said trellis during plant growth by standing on said foundation member and pulling upwardly on said uppermost turn to stress the iron beyond its then yield point and deform it permanently to hold said uppermost turn at an increased height position, said double conical unit being collapsible into a double spiral unit for between-season storage by forcing said uppermost turn into contact with said lowermost turn, such forcing stressing the iron beyond its yield point so that said unit remains in its collapsed state by the permanent deformation of said iron wire resulting from such collapsing.

2. An adjustable-height garden trellis comprising a single length of common iron wire shaped as a double flat spiral configuration, a first approximate half length of said wire starting with an external turn and spiraling inwardly with successive smaller turns in a substantially flat spiral to a smallest turn, the remainder of said length starting with said smallest turn and spiraling outwardly with successively larger turns in a substantially flat spiral to an external turn, said substantially flat spirals lying in closely adjacent planes to form a relatively compact double spiral unit, said unit being placeable on the ground with one external turn in contact therewith in an annular zone and extending beyond the next inner turn a sufficient distance to be engaged at opposed points by the feet of the operator, the other external turn being engageable by the hands of the operator to be lifted a desired distance sufficient to permanently expand said double spiral unit into a double conical configuration, such expansion imposing a torque on said successively smaller and successively larger turns sufficient to exceed the yield point of said wire of such turns and permanently deform same, the unit of double conical configuration being placeable around a growing plant so that the plant will grow upwardly within said double conical unit with its branches and foliage extending in part outwardly between the expanded turns, the weight of said branches and foliage not otherwise supported by the plant itself being borne exclusively by said turns and being transferred through said turns to the external turn in contact with the ground in said annular zone to maintain the double spiral unit stable against tipping.

NORVIN E. SMITH.

REFERENCES CITED

The following references are of record in the file of this patent:

UNITED STATES PATENTS

| Number | Name | Date |
| --- | --- | --- |
| 664,837 | Davis | Jan. 1, 1901 |
| 2,003,101 | Asman | May 28, 1935 |

FOREIGN PATENTS

| Number | Country | Date |
| --- | --- | --- |
| 2,055 | Great Britain | Jan. 25, 1913 |

OTHER REFERENCES

Publication, Washington Post, June 21, 1936, section VIII, page 8, Parade of Youth.